US012136413B1

United States Patent
Dingliwal et al.

(10) Patent No.: US 12,136,413 B1
(45) Date of Patent: Nov. 5, 2024

(54) DOMAIN-SPECIFIC PARAMETER PRE-FIXES FOR TUNING AUTOMATIC SPEECH RECOGNITION

(71) Applicant: Amazon Technologies, Inc., Seattle, WA (US)

(72) Inventors: Saket Dingliwal, Bellevue, WA (US); Sravan Babu Bodapati, Redmond, WA (US); Katrin Kirchhoff, Seattle, WA (US); Ankur Gandhe, Bothell, WA (US); Anubhav Mishra, Seattle, WA (US); John Baker, Bellevue, WA (US); Ashish Vishwanath Shenoy, Seattle, WA (US); Ravi Teja Gadde, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 399 days.

(21) Appl. No.: 17/710,762

(22) Filed: Mar. 31, 2022

(51) Int. Cl.
G06F 40/40 (2020.01)
G10L 15/06 (2013.01)
G10L 15/183 (2013.01)

(52) U.S. Cl.
CPC .......... G10L 15/063 (2013.01); G10L 15/183 (2013.01)

(58) Field of Classification Search
CPC . G06N 20/00; G06N 3/08; G06N 5/04; G06F 40/40; G06F 16/245; G06F 40/30; G10L 15/063; G10L 15/183; G10L 13/00; G10L 15/22; G10L 2015/223; G10L 15/26
See application file for complete search history.

(56) References Cited

U.S. PATENT DOCUMENTS

| | | | | |
|---|---|---|---|---|
| 6,865,528 | B1 * | 3/2005 | Huang | G10L 15/197 704/275 |
| 10,764,246 | B2 * | 9/2020 | Huang | H04L 61/3025 |
| 10,909,331 | B2 * | 2/2021 | Peitz | G10L 15/1815 |
| 2005/0182628 | A1 * | 8/2005 | Choi | G10L 15/08 704/252 |
| 2010/0049516 | A1 * | 2/2010 | Talwar | G10L 15/063 704/E15.001 |

(Continued)

OTHER PUBLICATIONS

Qian Zhang, Han Lu, Hasim Sak, Anshuman Tripathi, Erik McDermott, Stephen Koo, and Shankar Kumar, "Transformer transducer: A streamable speech recognition model with transformer encoders and RNN-T loss," in ICASSP 2020-2020 IEEE International Conference on Acoustics, Speech and Signal Processing (ICASSP). IEEE, 2020, pp. 7829-7833.

(Continued)

*Primary Examiner* — Jakieda R Jackson
(74) *Attorney, Agent, or Firm* — S. Scott Foster; Kowert, Hood, Munyon, Rankin & Goetzel, P.C.

(57) ABSTRACT

Domain-specific parameters may be used for tuning speech processing. A pre-trained transformer-based language model may train domain-specific parameters using domain-specific unlabeled text data. This domain-specific parameters can then be appended to candidate texts produced by a speech model on received speech data and input to the transformer-based language model to score the candidate texts. The scores of the candidate texts determined using the pre-trained transformer-based language model can then be used to select a candidate text for further speech processing.

20 Claims, 7 Drawing Sheets

(56) References Cited

U.S. PATENT DOCUMENTS

| | | | | |
|---|---|---|---|---|
| 2015/0058018 | A1* | 2/2015 | Georges | G10L 15/08 |
| | | | | 704/257 |
| 2017/0148433 | A1* | 5/2017 | Catanzaro | G10L 25/18 |
| 2019/0303442 | A1* | 10/2019 | Peitz | G10L 15/1822 |
| 2020/0357388 | A1* | 11/2020 | Zhao | G06F 18/2113 |
| 2021/0357762 | A1* | 11/2021 | Clement | G06N 3/084 |
| 2022/0035877 | A1* | 2/2022 | Nittur Sridhar | G06N 3/086 |
| 2022/0084510 | A1* | 3/2022 | Peng | G10L 15/063 |
| 2022/0115008 | A1* | 4/2022 | Pust | G10L 15/16 |
| 2022/0222489 | A1* | 7/2022 | Liu | G06F 18/214 |

OTHER PUBLICATIONS

Alex Graves, "Sequence transduction with recurrent neural networks," arXiv preprint arXiv:1211.3711, 2012, pp. 1-9.

William Chan, Navdeep Jaitly, Quoc Le, and Oriol Vinyals, "Listen, attend and spell: A neural network for large vocabulary conversational speech recognition," in 2016 IEEE International Conference on Acoustics, Speech and Signal Processing (ICASSP). IEEE, 2016, pp. 4960-4964.

Daniel Povey, Arnab Ghoshal, Gilles Boulianne, Lukas Burget, Ondrej Glembek, Nagendra Goel, Mirko Hannemann, Petr Motlicek, Yanmin Qian, Petr Schwarz, et al., "The kaldi speech recognition toolkit," in IEEE 2011 workshop on automatic speech recognition and understanding. IEEE Signal Processing Society, 2011, No. CONF.

Alec Radford, Jeffrey Wu, Rewon Child, David Luan, Dario Amodei, Ilya Sutskever, et al., "Language models are unsupervised multitask learners," OpenAI blog, vol. 1, No. 8, pp. 9, 2019.

Jacob Devlin, Ming-Wei Chang, Kenton Lee, and Kristina Toutanova, "Bert: Pre-training of deep bidirectional transformers for language understanding," arXiv preprint arXiv:1810.04805, 2018, pp. 1-16.

Ashish Shenoy, Sravan Bodapati, Monica Sunkara, Srikanth Ronanki, and Katrin Kirchhoff, "Adapting Long Context NLM for ASR Rescoring in Conversational Agents," in Proc. Interspeech 2021, 2021, pp. 3246-3250.

Ashish Shenoy, Sravan Bodapati, and Katrin Kirchhoff, "Asr adaptation for e-commerce chatbots using crossutterance context and multi-task language modeling," Proceedings of The 4th Workshop on e-Commerce and NLP, 2021 arXiv:2106.09532v1, pp. 1-8.

Jonas Pfeiffer, Andreas Ruckle, Clifton Poth, Aishwarya Kamath, Ivan Vulic, Sebastian Ruder, Kyunghyun Cho, and Iryna Gurevych, "Adapterhub: A framework for adapting transformers," arXiv preprint arXiv:2007.07779, 2020, pp. 1-9.

Brian Lester, Rami Al-Rfou, and Noah Constant, "The power of scale for parameter-efficient prompt tuning," arXiv preprint arXiv:2104.08691, 2021, pp. 1-15.

Trapit Bansal, Rishikesh Jha, and Andrew McCallum, "Learning to few-shot learn across diverse natural language classification tasks," arXiv preprint arXiv: 1911.03863, 2019, pp. 1-16.

Xiao Liu, Yanan Zheng, Zhengxiao Du, Ming Ding, Yujie Qian, Zhilin Yang, and Jie Tang, "Gpt understands, too," arXiv preprint arXiv:2103.10385, 2021, pp. 1-10.

Xiang Lisa Li and Percy Liang, "Prefix-tuning: Optimizing continuous prompts for generation," arXiv preprint arXiv:2101.00190, 2021, pp. 1-15.

Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al., "Language models are few-shot learners," 34th Conference on Neural Information Processing Systems (NeurIPS 2020), Vancouver, Canada, arXiv preprint arXiv:2005.14165, 2020, pp. 1-75.

Saket Dingliwal, Ashish Shenoy, Sravan Bodapati, Ankur Gandhe, Ravi Teja Gadde, and Katrin Kirchhoff, "Prompt-tuning in ASR systems for efficient domain-adaptation," CoRR, vol. abs/2110.06502, 2021, pp. 1-3.

Denis Peskov, Nancy Clarke, Jason Krone, Brigi Fodor, Yi Zhang, Adel Youssef, and Mona Diab, "Multidomain goal-priented dialogues (MultiDoGO): Strategies toward curating and annotating large scale dialogue data," in Proceedings of the 2019 Conference on Empirical Methods in Natural Language Processing and the 9th International Joint Conference on Natural Language Processing (EMNLP-IJCNLP), Hong Kong, China, Nov. 2019, pp. 4526-4536, Association for Computational Linguistics.

Reinhard Kneser and Hermann Ney, "Improved backing-off for m-gram language modeling," in 1995 international conference on acoustics, speech, and signal processing. IEEE, 1995, vol. 1, pp. 181-184.

Jeffrey O Zhang, Alexander Sax, Amir Zamir, Leonidas Guibas, and Jitendra Malik, "Side-tuning: A baseline for network adaptation via additive side networks," in Computer Vision-ECCV 2020: 16th European Conference, Glasgow, UK, Aug. 23-28, 2020, Proceedings, Part III 16. Springer, 2020, pp. 698-714, arXiv:1912.13503v4.

* cited by examiner

DOMAIN-SPECIFIC PARAMETER PRE-FIXES FOR TUNING AUTOMATIC SPEECH RECOGNITION

BACKGROUND

Over recent years, the number of small-footprint sensor-containing devices such as smart phones, wearable devices, personal assistant devices and various other "Internet of Things" (IoT) devices which can be used for accessing a variety of distributed or remote applications have been increasing dramatically. Many of these devices comprise sensors capable of detecting voiced commands. The small-footprint devices are often designed to communicate with server farms at data centers which can be used to perform application tasks based on the input provided via the devices.

In principle, the proliferation of devices that can collect voice signals increases the number of channels that can be used by vendors to provide various services and applications, thereby potentially increasing revenues for their businesses. Many customers may find it much more appealing or intuitive to, for example, order a meal using voiced commands than to order the meal after filling out a form on a computer screen. Users may typically prefer to use conversational or "natural" language to express their commands or intentions, in a manner similar to the way they would interact with other individuals, rather than being restricted to using specific "canned" phrases in a certain sequence. Applications which are designed to interact conversationally with users may be referred to as dialog-driven applications.

The interpretation of the signals received via the sensor-containing devices is a complex problem, especially in scenarios in which customers are allowed to express themselves informally or conversationally. To interpret arbitrary voice commands, for example, sophisticated automated speech recognition (ASR) algorithms and/or natural language processing (NLP) algorithms may need to be employed.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for domain-specific parameter pre-fixes for tuning automatic speech recognition are described herein. Automatic Speech Recognition (ASR) systems have found their use in numerous industrial applications in very diverse domains. Since domain-specific systems perform better than their generic counterparts on in-domain evaluation, the need for memory and compute-efficient domain adaptation is obvious. Particularly, adapting parameter-heavy transformer-based language models used for rescoring ASR hypothesis is challenging. In various embodiments, techniques are described herein that allow for a small number of domain token embedding parameters to prime a pre-trained transformer-based language model to a particular domain. With these extra parameters per domain, significant improvements over using non-domain-specific language models may be achieved. Additionally, using domain-specific parameter pre-fixed for tuning automatic speech recognition models may allow for performance improvements comparable to custom-trained language models without the number of resources or time used to produce custom-trained language models. In this way, domain-specific tuning can be quickly and efficiently performed across a wide variety of domains using a same pre-trained language model, as discussed in detail below.

ASR systems may form a key component of various products across industries. Due to the latest advancements in their performance, ASR systems have been deployed in wide range of domains, including healthcare, travel reservations, and customer services. One technique to further improve the performance of these system is to do a rescoring of the n-best hypotheses with an external language model because of larger availability of textual data as compared to labeled audio data.

For instance, recent transformer-based language models such as Generative Pre-trained Transformer 2 (GPT-2) and Bidirectional Encoder Representations from Transformers (BERT) have shown considerable gains in language modeling tasks over conventional models. However, these language models contain millions of parameters and adapting them for low-resource, domain-specific ASR systems poses challenges. Maintaining multiple domain-adapted copies of these language models is not scalable as it involves large memory, compute, and maintenance costs. On the other hand, a common version of such a language model for all the domains falls short in performance than domain-specific language models. Therefore, techniques of domain-specific parameter pre-fixes for tuning automatic speech recognition as described herein provide a middle ground between performance and costs with respect to ASR systems.

Rather than adapting language models for natural language processing tasks, techniques for domain-specific parameter pre-fixes for tuning automatic speech recognition provide domain adaptation for ASR systems. These techniques are implement to learn a set of domain-specific parameters (which may be small to reduce the overall model size and computational resources needed to execute) to better score domain-specific ASR candidate texts (sometimes referred to as "hypotheses" or "hypothesis sentences") than an unadapted transformer-based language model.

In various embodiments, domain-specific parameters may be obtained using domain-prompts. In some embodiments, domain-prompts may be represented as domain-specific embeddings, which when prefixed to token embeddings of any sentence and passed through a pre-trained transformer-based language model that has not itself been tuned to the domain, gives the probability of occurrence of the sentence particular to the domain. The number of trainable domain-specific parameters (e.g., the number of prompt tokens multiplied by the embedding size) in various embodiments may be significantly smaller than the size of the language model and yet achieve similar performance to a fully fine-tuned domain-specific language model. Thus, the techniques of domain-specific parameter pre-fixes for tuning automatic speech recognition described in various embodiments may prime a transformer-based language model to a particular domain in a parameter-efficient manner, with small memory and compute utilization (allowing for wide implementation across different systems with different computational and memory capacities or capabilities), provide a significant improvement over ASR system with non-tuned language models, and, particularly in low-data settings, matches the performance of fully-fine-tuned language models even though it uses a significantly smaller number of parameters (e.g., <0:3%) of the complete model.

In various embodiments, techniques for domain-specific parameter pre-fixes for tuning automatic speech recognition may allow for the transformer-based language model to directly learns the prompt token embeddings using a few labeled examples for a task instead of designing these prompts manually for the task. These techniques are applicable across different domains of a task, so that a sentence can be pre-fixed with additional domain-specific tokens such that it improves the score of the sentences from that domain. It may be the case that the self-attention layer in transformer-based language models create an interaction between the learnt domain embeddings and the tokens from sentences, thereby improving the score to cater to the domain. During training of these additional domain-specific tokens, a randomly-initialized domain-prompts embedding may be used to training sentences from the domain, pass it through a pre-trained transformer-based language model, and predict the next token. The loss may be back propagated to update the domain-specific embedding, keeping every other parameter fixed. During inference, the learnt domain-prompts may be pre-fixed to an input sentence and used to compute perplexity of the whole input. For an ASR system, these perplexity scores may be used to re-rank the hypotheses from speech model.

In some embodiments, rather than initializing the domain-prompts embeddings randomly, token embeddings may be token embeddings of the most frequent words in the vocabulary of the domain. Second, since the same learnt domain-prompts are prefixed to every hypothesis in the domain, the state of the transformer may be precomputed and saved until k time-steps, where k is the number of domain-prompts tokens. This state may then be reused while scoring all the hypotheses from the same domain to save on inference latency of the ASR system.

Figure 1:
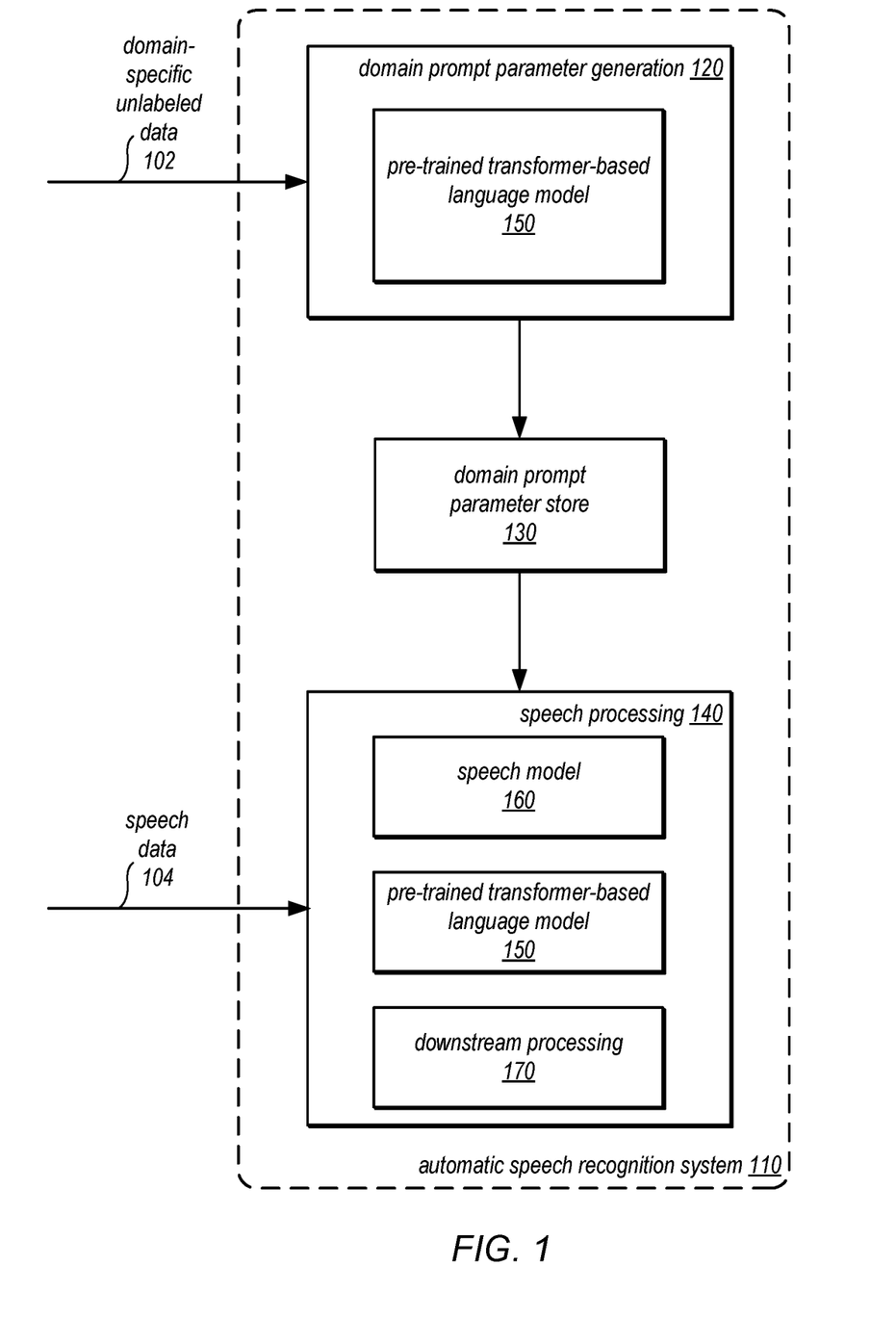
FIG. 1 illustrates a logical block diagram of domain-specific parameter pre-fixes for tuning automatic speech recognition, according to some embodiments.

FIG. 1 illustrates a logical block diagram of domain-specific parameter pre-fixes for tuning automatic speech recognition, according to some embodiments. Automatic speech recognition system 100 may be implemented to provide various kinds of applications that can be executed using speech recognition, such as interactions using voice dialog. For example, automatic speech recognition system 100 may be implemented to use various communication technologies (e.g., Internet-based, telephonic-based, radio-based, etc.) which support the exchange of audio data, through a two-way audio connection (e.g., a Voice Over Internet Protocol (VOIP)). In order to perform various operations or functions, automatic speech recognition system 100 may prompt and respond to various voice audio data provided via a client device to automatic speech recognition system 100. As noted earlier, a client may include small-footprint sensor-containing devices such as smart phones, wearable devices, personal assistant devices and various other "Internet of Things" (IoT) devices, recording devices, mobile phones or other mobile computing devices, desktop or other non-mobile computing devices, or other devices capable of capturing and presenting audio data for further processing by automatic speech recognition system 100. In some embodiments, automatic speech recognition system 100 may be stand alone system, or may be implemented or hosted as part of a provider network service, like dialog driven application management service 210 in FIG. 2 discussed below.

As discussed above, domain-specific unlabeled data 102 may be provided to domain prompt parameter generation 120. Domain-specific unlabeled data, like the examples discussed below with regard to FIG. 3, may include one or more sentences, statements, text fragments, or other language sets that are specific to a domain (e.g., text related to an area of knowledge or activities which may be evaluated by an ASR system). The domain-specific unlabeled data 102 may be provided as part of a request to create a tuned ASR system for the domain. In some embodiments, domain-specific unlabeled data 102 may be selected out of a catalog or other sets unlabeled data for various domains. Domain prompt parameter generation 120 may use pre-trained transformer-based language model 150 (e.g., GPT-2 or BERT) to produce domain-specific parameters, according to the techniques discussed below with regard to FIGS. 3 and 8. These domain parameters may be stored as an embedding, in some embodiments, at domain prompt parameter store 130 and later used as part of speech processing 140.

For example, when speech data 104 is received, a speech model 160 (e.g., a trained acoustic model or neural-based model) may be used to determine candidate texts (e.g., hypotheses) for the intent or meaning of the speech data 104. Speech data 104 may be audio data, in some embodiments that includes a spoken language for recognition and other processing by automatic speech recognition system 110. To utilize a domain-specific model, the domain-specific parameters generated from domain-specific unlabeled data 102 may be obtained from domain prompt parameter store 130 and may be appended as pre-fixes to the candidate texts to determine scores at pre-trained transformer-based language model 150 (which is not itself tuned to the domain but rather is the same language model used to generate the domain-specific parameters, as is shown by being present in both domain prompt parameter generation 120 and speech processing 140). One of the candidate texts may be selected based on these scores and used for performing downstream processing 170 (e.g., performing various tasks, generating and sending back a response, etc.).

Please note that the previous description of domain-specific parameter pre-fixes for tuning automatic speech recognition is a logical illustration and thus is not to be construed as limiting as to the implementation of an automatic speech recognition system, client, or various other illustrated features.

This specification continues with a general description of a provider network that implements multiple different services, including a dialog driven application management service, which may implement domain-specific parameter pre-fixes for tuning automatic speech recognition. Then various examples of, including different components/modules, or arrangements of components/module that may be employed as part of implementing the services are discussed. A number of different methods and techniques to implement domain-specific parameter pre-fixes for tuning automatic speech recognition are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
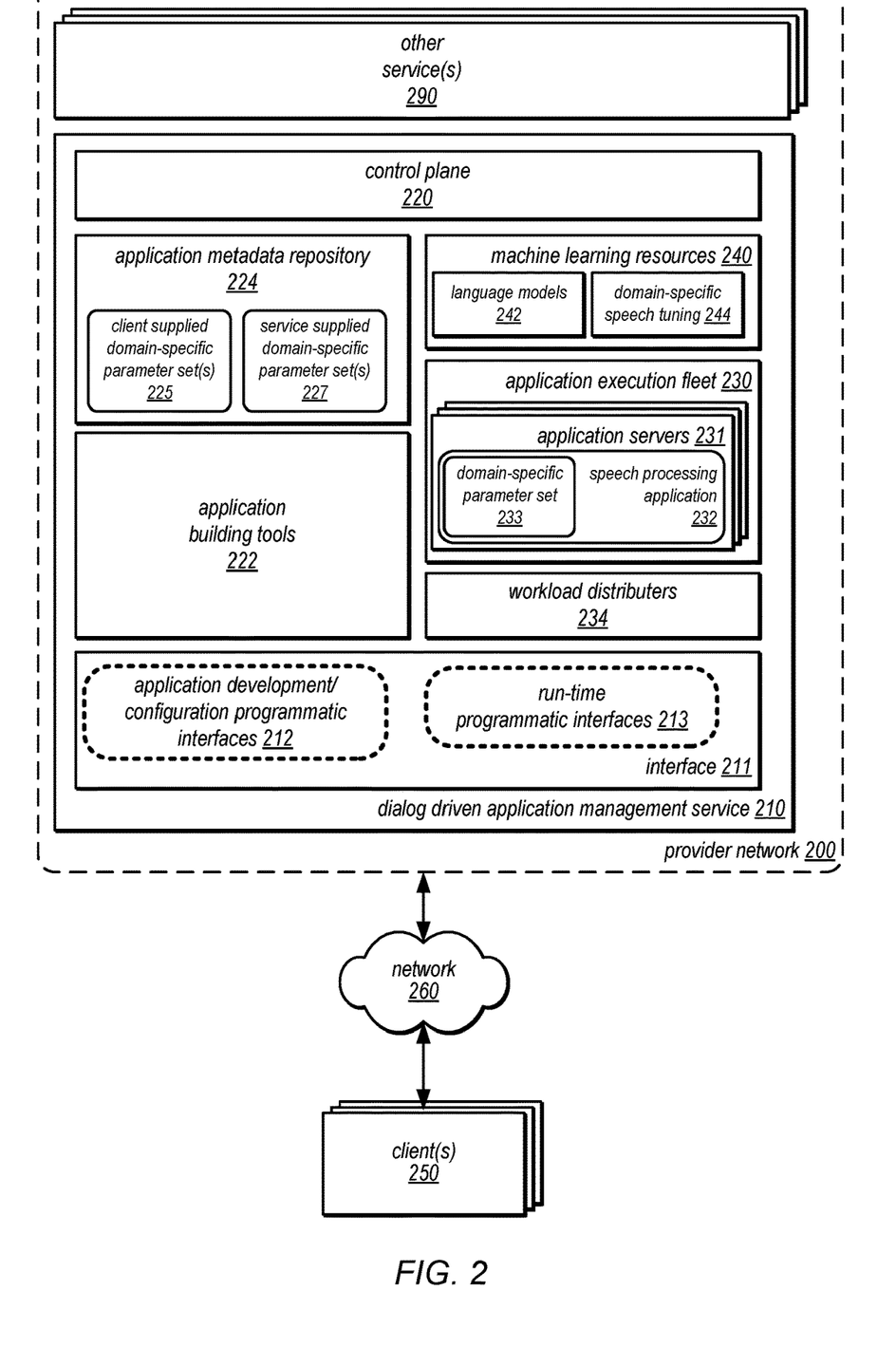
FIG. 2 illustrates an example provider network that may implement a dialog driven application management service that implements domain-specific parameter pre-fixes for tuning automatic speech recognition for hosted speech processing applications, according to some embodiments.

FIG. 2 illustrates an example provider network that may implement a dialog driven application management service that implements domain-specific parameter pre-fixes for tuning automatic speech recognition for hosted speech processing applications, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as dialog driven application management service 210, and/or any other type of network-based services 290 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of dialog driven application management service 210 may be implemented by a particular node or may be distributed across several nodes. In some embodiments, a given node may implement the functionality of more than one service system component (e.g., more than one data store component).

Dialog driven application management service 210 may implement interface 211 to allow clients (e.g., client(s) 250 or clients implemented internally within provider network 200, such as a client application hosted on another provider network service like an event driven code execution service or virtual compute service) to interact with dialog driven application management service. Interface 211 may be one or more a graphical user interfaces, programmatic interfaces that implements Application Program Interfaces (APIs) and/or a command line interfaces).

In some embodiments, interface 211 may be broadly classified into application development and configuration programmatic interfaces 212 and run-time programmatic interfaces 213. The application development and configuration programmatic interfaces 212 may be used by application owners and developers to create and provide preferred configuration settings for various dialog-driven applications which are to be executed using the application execution fleet 230, machine learning resources 240, and/or external task fulfillment resources, in various embodiments. Application owners may interact with the dialog driven application management service via the interfaces 212 from a variety of application owner devices (e.g., on clients 250) in different embodiments, such as desktop computers, laptops, mobile devices and the like. Information about the dialog-driven applications, such as logical descriptors of the applications, program code (e.g., in source code or executable form), configuration settings for various stages or interaction categories of the applications, may be stored in an application metadata repository 224, in at least some embodiments.

End users (also referred to as clients) of dialog driven applications may interact with the applications via run-time programmatic interfaces 213 in the depicted embodiment. For example, the end users may provide input in the form of audio signals, to various sensors at end user devices (e.g., on clients 250). A variety of end user devices may be used to interact with dialog-driven applications in different embodiments, such as phones, tablet computing devices, wearable computing devices such as smart watches, game-playing devices or consoles, automated personal assistant devices, augmented reality devices, virtual reality devices, IoT devices, laptops, other mobile devices, desktops, compute instances of virtualized computing services, and so on. The end user input may be processed initially (e.g., subdivided into smaller units called events or blocks, each comprising a few hundred bytes of data) at dialog driven application management service 210 client-side components at the end user devices, and then representations of the end user-generated input may be transmitted to the dialog driven application management service 210 from the client-side components in the depicted embodiment via run-time programmatic interfaces 213. In some implementations, a client-side component may comprise one or more processes or threads of execution.

Depending on the type of action the end user wishes to perform using the dialog-driven application, several interactions with the dialog driven application management service 210 may be required, e.g., over one or more connections established between a client-side component and one or more application servers 231 in at least some embodiments. A given interaction may, for example, comprise transmission of a set of user-generated input to the application server, analysis of the user-generated initiated by the server (and performed, for example, using language models 242), and a response provided to the end user from the server. In at least some embodiments, one or more resources external to the dialog driven application management service may be used by servers 231 to initiate tasks of a dialog-driven application after a set of parameters for the tasks have been obtained from the user-generated input (e.g., implementing resources in other service(s) 290). Such tasks may include, for example, retrieval of requested bank or credit card information from a source such as a financial organization's database, ordering of an item from a catalog, and so on. External task fulfillment resources utilized by the servers 231 may include, for example, a dynamically-provisioned event driven computing service of provider network 200, other computing or storage services of a cloud computing environment, resources located at data centers of the application owners, and so on. The workload distributors 234, comprising one or more computing devices, may be responsible for selecting the particular server 231 in fleet 230 with which a given client-side component is to be connected, e.g., upon receiving a connection establishment request from the client-side component in various embodiments.

Dialog driven application management service 210 may implement a control plane 220 to perform various control operations to implement the features of dialog driven application management service 210. For example, control plane 220 may monitor the health and performance of requests at different components workload distributers, application servers 231, machine learning resources 240, application building tools 222, and application metadata repository 224, such as domain-specific parameters 225 (e.g., the health or performance of various nodes implementing these features of dialog driven application management service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments.

Dialog driven application management service 210 may implement application building tools 222, in some embodiments. In various embodiments, representations or descriptors of dialog-driven applications involving one or more categories of interactions with end users, and actions to be initiated based on analysis of end user-generated inputs, may be obtained at the dialog driven application management service. Such representations may, for example, be generated as a result of the use of one or more easy-to-use application building tools 222 by application owners. The application building tools 222, may, for example, include a multi-step dialog setup coordinator responsible for enabling application developers to specify the steps of the interactions needed to determine parameter values for fulfilling various application intents, as well as a fulfillment integration coordinator responsible for inserting the appropriate hooks for invoking resources for implementing the intents into the dialog-driven application. When creating an application using such tools 222, an application owner may indicate the external task fulfilment resources to be used (if any) for the application, such as a particular function to be invoked using a dynamically-provisioned event driven computing service, and this information may be stored as part of the application descriptor or representation. Several types of configuration settings for individual categories of the interactions (or for groups of categories) may also be obtained at the dialog driven application management service 210, e.g., via one or more programmatic interfaces 212 and/or via the tools 222 in at least some embodiments. For example, requests to generate and use a domain-specific transformer-based language model as part of a speech processing application 232 may be specified by requests to invoke domain-specific speech tuning 244 using either a client supplied one of domain-specific parameter set(s) 225 or service supplied domain-specific parameter set(s) 227 to produce the domain-specific parameter set 233 to be utilized as part of speech processing application 232 as discussed in detail below.

Dialog driven application management service 210 may implement machine learning resources 240. Machine learning may refer to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. Machine learning resources 240 may be utilized not just to analyze and interpret user-generated input, but also to automatically tune some or all of the configuration settings chosen for speech processing applications 232. For example, in some embodiments, domain-specific speech tuning 244 may be implemented to generate domain-specific parameters from domain-specific unlabeled data according to the techniques discussed below with regard to FIG. 3.

In various embodiments, dialog driven application management service 210 may implement application execution fleet 230 to host or otherwise implement speech processing applications 232 (e.g., built via tools 222 and hosted in dialog driven application management service 210). As part of implementing speech processing applications 232 on applications servers 231, domain-specific parameters 233 may be invoked, specified, or supplied as a feature built into or utilized by speech processing applications 232. As discussed in detail above with regard to FIG. 1 and below with regard to FIGS. 3-4, domain-specific parameters may be used to tune speech recognition in speech processing applications, in some embodiments.

Generally speaking, clients 250 may encompass any type of client that can submit network-based requests to provider network 200 via network 260, including requests for dialog driven application management service 210 (e.g., a request to develop a dialog driven application or a run-time request to establish a dialog communication). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of dialog driven application management service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like dialog driven application management service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
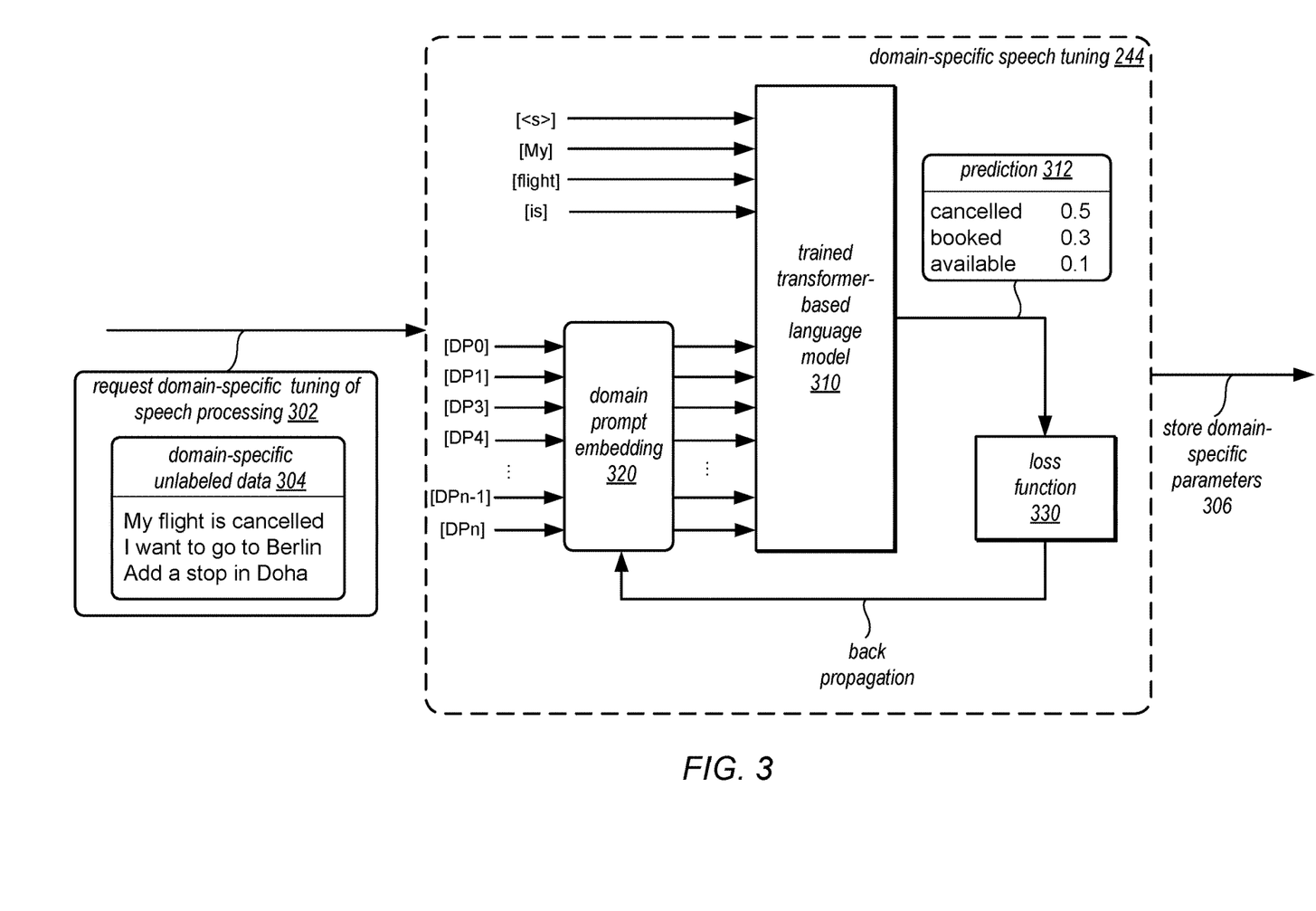
FIG. 3 illustrates a logical block diagram of domain-specific speech tuning, according to some embodiments.

FIG. 3 illustrates a logical block diagram of domain-specific speech tuning, according to some embodiments. Domain-specific speech tuning 244 may receive a request to tune speech processing 302. The request may include domain-specific unlabeled text data 304 or may reference domain-specific unlabeled data 304 stored in a data storage system as part of provide network 200 (e.g., in a data storage service such as in a file, data object, or location of an object-based data store). In some embodiments, domain-specific unlabeled data 304 may be collected via various example interactions, questions or statements that are obtained from earlier interactions. Like the domain-specific parameter sets discussed above with regard to FIG. 2, in some embodiments, domain-specific unlabeled data 304 may be obtained from a catalog of different domains offered by dialog-driven application management service for use in a speech processing application. In some embodiments, the request 302 may include other tuning configuration information, such as the number of parameters in the domain prompt embedding (e.g., larger or smaller to better fir the unlabeled data and/or resource requirements of the speech processing application).

Request 302 may be accepted or rejected, in some embodiments according to size criteria enforced with regard to domain-specific unlabeled data 304. For example, the size of domain-specific unlabeled data 304 is too small (or too large), then the request with an error indication of the size criteria may be provided.

Pre-trained transformer-based language model 310 may be used to iterate through tokens of unlabeled data 304 to train domain prompt embedding 320 parameters through a next token prediction technique 312, applying a loss function 330 (e.g., cross entropy loss or hinge loss) and back propagation (e.g., by determining the gradient of the loss function with respect to each weight output from a last layer of the transformer-based language model by the chain rule, computing the gradient one layer at a time, iterating backward from the last layer). When training of the domain-prompt embedding is completed (e.g., when no more tokens remain in domain-specific unlabeled data 304, such as when "Doha" has been considered as illustrated in FIG. 3), the domain specific parameters 306 may be stored (e.g., as an embedding) for use in a speech processing application as discussed in detail below.

Figure 4:
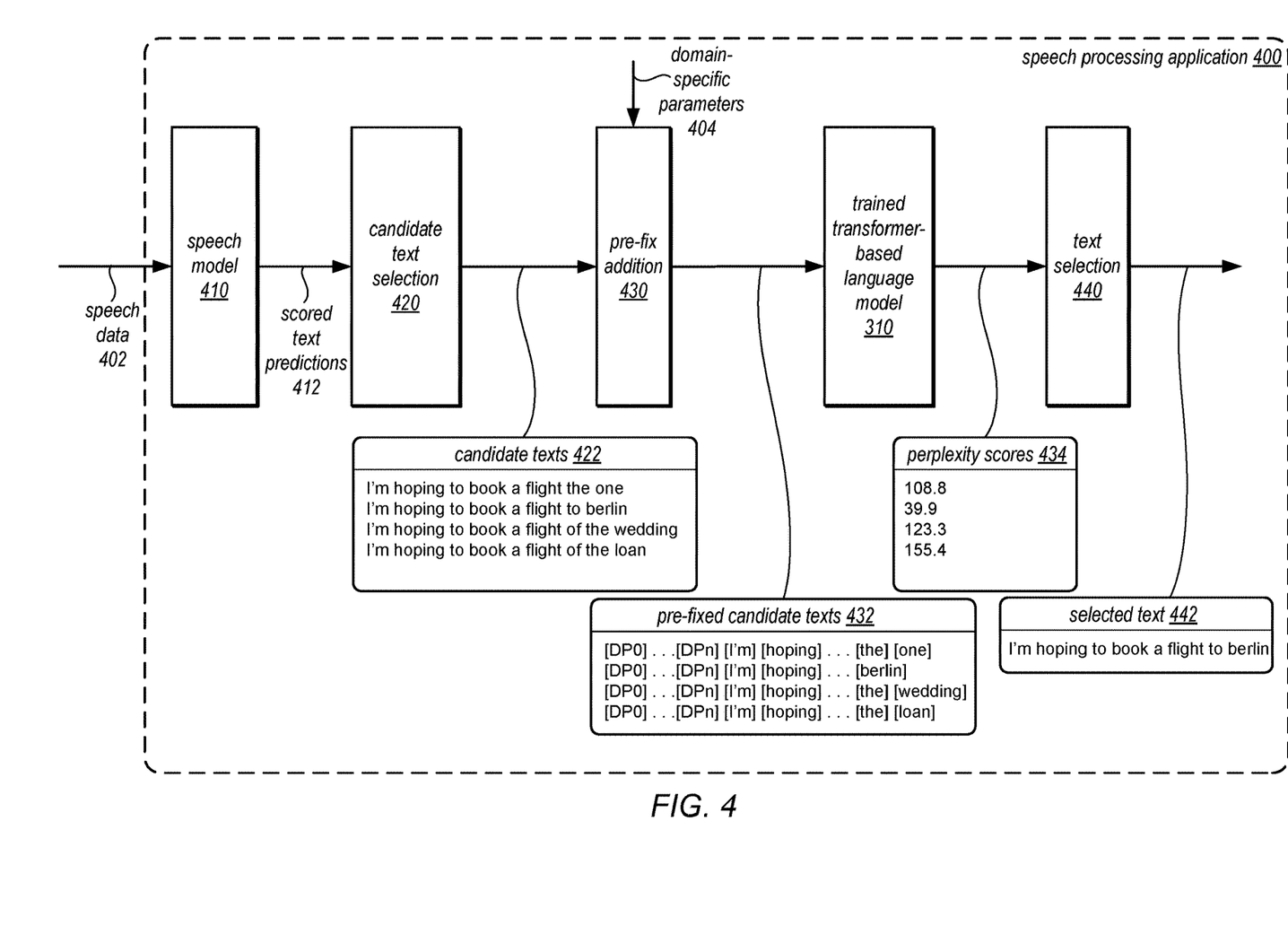
FIG. 4 illustrates a logical block diagram of a speech processing application that uses domain-specific parameter pre-fixes, according to some embodiments.

FIG. 4 illustrates a logical block diagram of a speech processing application that uses domain-specific parameter pre-fixes, according to some embodiments. Speech processing application 400 may receive speech data 402 (e.g., via an interface). Speech processing application may 400 have been deployed responsive to a request to deploy the speech processing application (e.g., via interface 212 of dialog driven application management service 210), which may have also included an identifier used to identify domain-specific parameters 404 for use as part of speech processing. In some embodiments, other parameters or features to configure deployment or performance of the speech processing application, such as the number of candidate texts selected may be specified as a threshold number of candidate texts.

Speech model 410 may be applied to the speech data 402 and generate scored text predictions 412. Speech model 410 may be, for example, a trained acoustic model or a trained neural network-based model, in some embodiments. Candidate text selection 420 may selected a number of text predictions based on the scores to determine at least a subset of candidate texts. In some embodiments, a threshold number of candidate texts selected may be specified as part of a deployment request, as discussed above. Candidate texts 422 may be provided to pre-fix addition 430, which may use the domain specific parameters 404 identified for speech processing application 400 to produce pre-fixed candidate texts 432. For example, for each of the different candidate texts "I'm hoping . . . the one," "I'm hoping . . . to berlin," "I'm hoping . . . the wedding," and "I'm hoping . . . the loan" the same domain-specific parameters [DP0] through [DPn] may be added, as indicated in 432

Pre-trained transformer-based language model 310 (same as in FIG. 3), may take as input pre-fixed candidate texts 432 and produce predictions along with perplexity scores 434 (e.g., predictions of a next word). These perplexity scores may indicate a confidence in the language model 310 of the correct candidate text. Text selection 440 may then identify selected text 442 according to perplexity scores 434 (e.g., selecting a candidate text with a lowest perplexity score). This selected text 442 may be provided to other downstream processing stages (e.g., to generate requests to programmatically book a flight to Berlin using the interface of a flight planning system for an air travel company).

The previous examples of domain-specific parameter pre-fixes for tuning automatic speech recognition provide some of the many possible combinations of features, and thus are intended to be illustrative and not intended to be limiting to other combinations of features.

Although FIGS. 2-4 have been described and illustrated in the context of a provider network implementing a dialog driven application management service, the various components illustrated and described in FIGS. 2-4 may be easily applied to other systems that implement automatic speech recognition or other forms of speech processing. As such, FIGS. 2-4 are not intended to be limiting as to other embodiments of context inclusive interruption handling for dialog driven systems.

Figure 5:
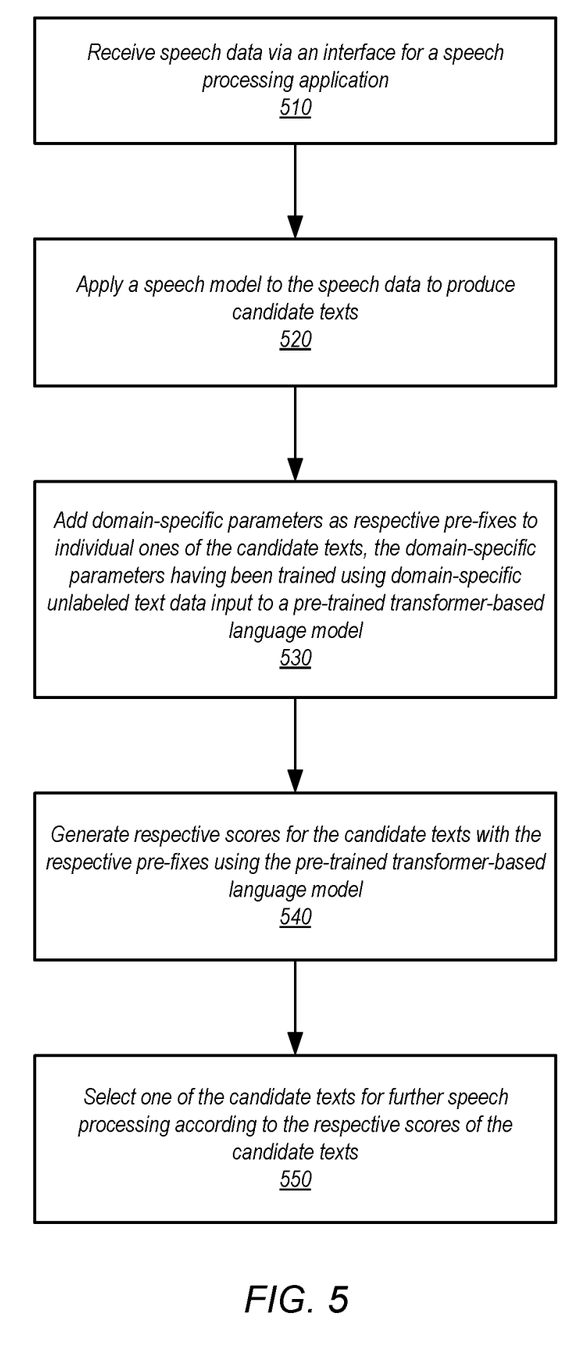
FIG. 5 illustrates a high-level flowchart of various methods and techniques to implement domain-specific parameter pre-fixes for tuning automatic speech recognition, according to some embodiments.

FIG. 5 illustrates a high-level flowchart of various methods and techniques to implement domain-specific parameter pre-fixes for tuning automatic speech recognition, according to some embodiments. Various different systems and devices may implement the various methods and techniques described below, either singly or working together. Therefore, the above examples and or any other systems or devices referenced as performing the illustrated method, are not intended to be limiting as to the other different components, modules, systems, or devices.

As indicated at 510, speech data may be received via an interface for a speech processing application. For example, the speech data may be included in audio data that is capture and transmitted as an audio file or streaming audio transmission to the speech processing application. In some embodiments, the speech data may have been previously recorded and stored for use by the speech processing application and thus may be accessed and returned to the speech processing application by obtaining the speech data from a data store.

As indicated at 520, a speech model may be applied to the speech data to produce candidate texts for the speech data. For example, as noted above different types of speech models may be used, such as a trained acoustic model or a trained speech model. Consider the example of the trained acoustic model. The speech data, included in audio data, may take one or more frames of the audio signal of the audio data and be analyzed by a Hidden Markov Model (HMM) to find a speech model that can be used to provide different candidate texts (e.g., hypotheses) for the speech data. Similarly, in another example, a trained neural model (e.g., a Deep Neural Network (DNN)) may be used to generate candidate texts from speech data (e.g., audio data that is transformed into an input embedding to be processed through the DNN).

As indicated at 530, domain-specific parameters may be added as respective pre-fixes to individual ones of the candidate texts. For example, as illustrated above with regard to FIG. 4, individual parameter values (e.g., DP[0] . . . DP[n]) may be added to tokenized inputs of the different candidate texts. As discussed in detail below with regard to FIG. 6 and above with regard to FIG. 3, the domain-specific parameters may have been trained using domain-specific unlabeled text data input to a pre-trained transformer-based language model. As indicated at 540, respective scores for the candidate texts with the respective prefixes may be generated using the pre-trained transformer-based language model, in some embodiments. For example, the pre-trained transformer-based language models may be used to implement next word prediction for each word of the candidate texts with appended pre-fixes. A perplexity score may be determined by aggregating the probable correctness of each word in the candidate texts as recognized by the pre-trained transformer-based language model. The resulting perplexity score of each candidate text may then indicate which candidate text is likely to be correct, as the aggregate probabilities indicate the likelihood that the combination of words in the candidate text are grammatically correct and likely to occur.

As indicated at 550, one of the candidate texts may be selected for further speech processing according to the respective scores of the candidate texts. For example, various downstream processing tasks, such as generating and returning a speech response as part of a dialog may be performed, recognizing and performing an operation (e.g., via request or invocation of various other system interfaces, such as API calls to remote systems to perform the operation), or various other processing may be performed.

Figure 6:
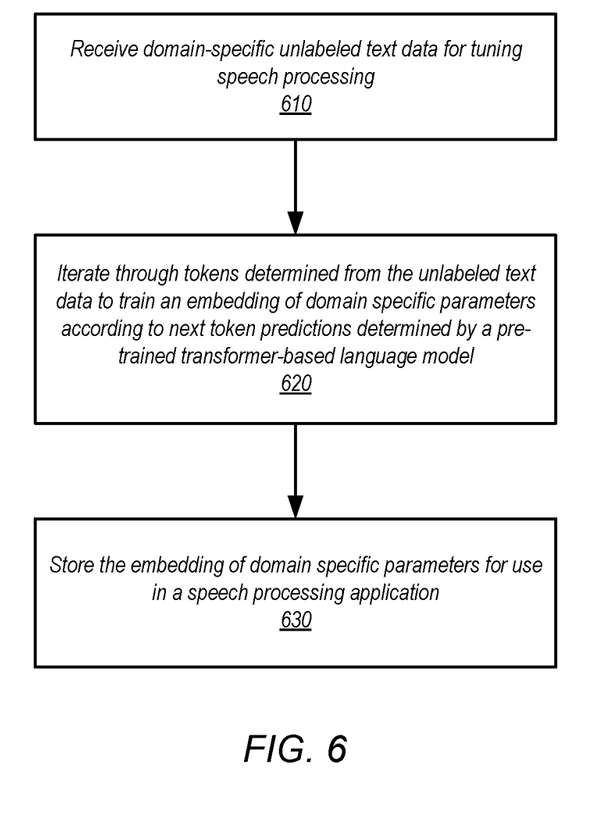
FIG. 6 illustrates a high-level flowchart of various methods and techniques to implement training domain-specific parameter pre-fixes for tuning automatic speech recognition, according to some embodiments.

FIG. 6 illustrates a high-level flowchart of various methods and techniques to implement training domain-specific parameter pre-fixes for tuning automatic speech recognition, according to some embodiments. As indicated at 610, domain-specific unlabeled text data may be received for tuning speech processing, in some embodiments. The unlabeled text data may be received as part of a request to tune a speech processing application, in some embodiments. In some embodiments, a size criteria may be enforced so that domain-specific unlabeled text data that is too small or too large may cause the rejection of the request to perform domain specific tuning of the speech processing application.

As indicated at 620, tokens determined from the unlabeled text data may be iterated through to train an embedding of domain specific parameters according to next token predictions determined by a pre-trained transformer-based language model, in some embodiments. The tokens may be determined as individual words and text components (e.g., end of line, end of sentence, punctuation, etc.). Iteration may continually add new tokens from the training data in order to continue next work predictions as the input grows longer. Iteration may continue until each token in the unlabeled text data is input. Training of the domain-specific parameters may occur according to a loss function for predictions and the use of back propagation with respect to the parameters after each prediction. In at least some embodiments, the number of domain specific parameters may be specified in the request to tune a speech processing application (e.g., as discussed above with regard to FIG. 3). As indicated at 630, the embedding of domain specific parameters may be stored for use in a speech processing application, in some embodiments. For example, the embedding of domain-specific parameters may be stored in storage location associated with a particular user, owner, or developer of a speech processing application.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
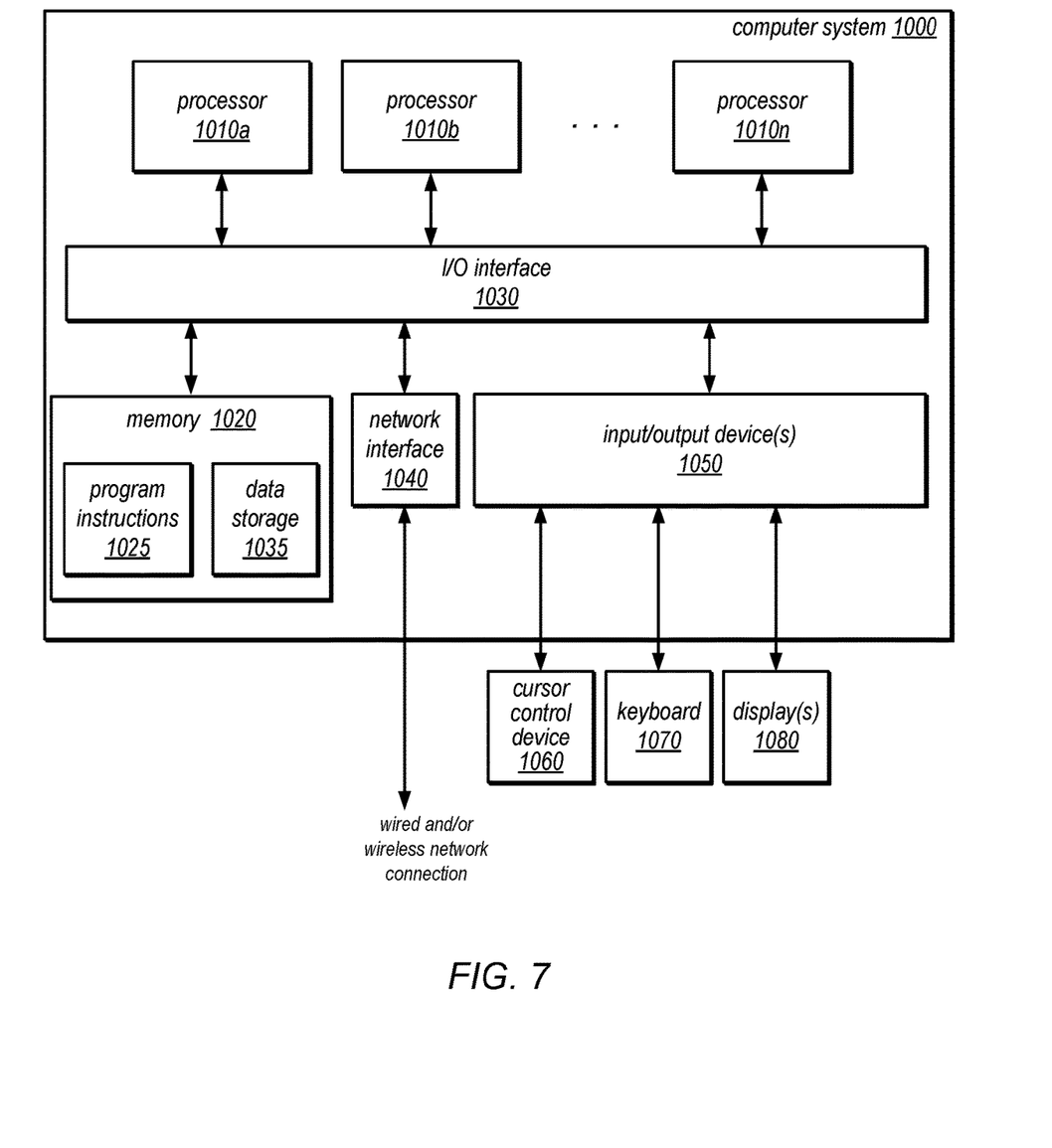
FIG. 7 illustrates an example system to implement the various methods, techniques, and systems described herein, according to some embodiments.

Embodiments of domain-specific parameter pre-fixes for tuning automatic speech recognition as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including domain-specific parameter pre-fixes for tuning automatic speech recognition, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
   receive speech data via an interface for a speech processing application;
   apply a speech model to the speech data to select a plurality of candidate texts predicted for the speech data by the speech model according to respective prediction scores of the plurality of candidate texts;
   append domain-specific parameters as respective pre-fixes to individual ones of the plurality of candidate texts, wherein the domain-specific parameters are trained using domain-specific unlabeled text data input to a pre-trained transformer-based language model;
   input the plurality of candidate texts with respectively appended domain-specific parameters to the pre-trained transformer-based language model to generate respective perplexity scores for the plurality of candidate texts; and
select one of the plurality of candidate texts for further speech processing by the speech processing application according to the respective perplexity scores of the plurality of candidate texts.

2. The system of claim 1, wherein the memory stores further instructions that cause the at least one processor to receive a request to deploy the speech processing application, wherein the request includes an identifier used to select the domain-specific parameters for use as part of the speech processing application.

3. The system of claim 1, wherein the memory stores further instructions that cause the at least one processor to:
receive a request to tune speech processing for the speech processing application, wherein the request comprises the domain-specific unlabeled text data; and
train the domain-specific parameters using the domain-specific unlabeled text data as input to the pre-trained transformer-based language model.

4. The system of claim 1, wherein the speech processing application is hosted as part of a dialog driven application management service offered as part of a provider network and wherein the speech processing application is configured via an interface of the dialog driven application management service.

5. A method, comprising:
receiving speech data via an interface for a speech processing application;
applying, by the speech processing application, a speech model to the speech data to produce a plurality of candidate texts for the speech data;
adding, by the speech processing application, domain-specific parameters as respective pre-fixes to individual ones of the plurality of candidate texts, wherein the domain-specific parameters are trained using domain-specific unlabeled text data input to a pre-trained transformer-based language model;
generating, by the speech processing application, respective scores for the plurality of candidate texts with the respective pre-fixes using the pre-trained transformer-based language model; and
selecting, by the speech processing application, one of the plurality of candidate texts for further speech processing according to the respective scores of the plurality of candidate texts.

6. The method of claim 5, further comprising receiving a request to deploy the speech processing application, wherein the request includes an identifier used to select the domain-specific parameters for use as part of the speech processing application.

7. The method of claim 6, wherein the request further specifies a threshold number for producing the plurality of candidate texts.

8. The method of claim 5, wherein the speech processing application is hosted as part of a provider network service, wherein the speech model and the pre-trained transformer-based language model are used as part of different speech processing application that is also hosted as part of the provider network service, wherein the different speech processing system uses different domain-specific parameters trained from different domain-specific unlabeled text data.

9. The method of claim 5, further comprising:
receiving a request to tune speech processing for the speech processing application, wherein the request comprises the domain-specific unlabeled text data; and
training the domain-specific parameters using the domain-specific unlabeled text data as input to the pre-trained transformer-based language model.

10. The method of claim 9, wherein training the domain-specific parameters using the domain-specific unlabeled text data as input to the pre-trained transformer-based language model comprises iterating through tokens determined from the domain-specific unlabeled text data according to next token predictions determined by the pre-trained transformer-based language model.

11. The method of claim 5, further comprising rejecting a request to tune speech processing for the speech processing application using different domain-specific unlabeled text data responsive to determining that the domain-specific unlabeled text data does not satisfy a size criteria.

12. The method of claim 5, wherein the speech processing application is hosted as part of a dialog driven application management service offered as part of a provider network and wherein the speech processing application is configured via an interface of the dialog driven application management service.

13. One or more non-transitory, computer-readable storage media, storing program instructions that when executed on or across one or more computing devices cause the one or more computing devices to implement:
receiving speech data via an interface for a speech processing application;
applying, by the speech processing application, a speech model to the speech data to produce a plurality of candidate texts for the speech data;
adding, by the speech processing application, domain-specific parameters as respective pre-fixes to individual ones of the plurality of candidate texts, wherein the domain-specific parameters are trained using domain-specific unlabeled text data input to a pre-trained transformer-based language model;
generating, by the speech processing application, respective scores for the plurality of candidate texts with the respective pre-fixes using the pre-trained transformer-based language model; and
selecting, by the speech processing application, one of the plurality of candidate texts for further speech processing according to the respective scores of the plurality of candidate texts.

14. The one or more non-transitory, computer-readable storage media of claim 13, storing further instructions that when executed by the one or more computing devices cause the one or more computing devices to further implement receiving a request to deploy the speech processing application, wherein the request includes an identifier used to select the domain-specific parameters for use as part of the speech processing application.

15. The one or more non-transitory, computer-readable storage media of claim 14, wherein the request further specifies a threshold number for producing the plurality of candidate texts.

16. The one or more non-transitory, computer-readable storage media of claim 13, storing further instructions that when executed by the one or more computing devices cause the one or more computing devices to further implement:
receiving a request to tune speech processing for the speech processing application, wherein the request comprises the domain-specific unlabeled text data; and
training the domain-specific parameters using the domain-specific unlabeled text data as input to the pre-trained transformer-based language model.

17. The one or more non-transitory, computer-readable storage media of claim 16, wherein, in training the domain-specific parameters using the domain-specific unlabeled text data as input to the pre-trained transformer-based language model, the program instructions cause the one or more computing devices to implement iterating through tokens determined from the domain-specific unlabeled text data according to next token predictions determined by the pre-trained transformer-based language model.

18. The one or more non-transitory, computer-readable storage media of claim 16, wherein a number of the domain-specific parameters to train is specified as part of the request to tune speech processing for the speech processing application.

19. The one or more non-transitory, computer-readable storage media of claim 13, wherein the speech processing application is hosted as part of a dialog driven application management service offered as part of a provider network and wherein the speech processing application is configured via an interface of the dialog driven application management service.

20. The one or more non-transitory, computer-readable storage media of claim 13, wherein the speech processing application is hosted as part of a provider network service, wherein the speech model and the pre-trained transformer-based language model are used as part of different speech processing application that is also hosted as part of the provider network service, wherein the different speech processing system uses different domain-specific parameters trained from different domain-specific unlabeled text data.

* * * * *